US011297429B2

(12) United States Patent
Montreevat

(10) Patent No.: US 11,297,429 B2
(45) Date of Patent: Apr. 5, 2022

(54) PROXIMITY DETECTION FOR WIRELESS IN-EAR LISTENING DEVICES

(71) Applicant: SYNAPTICS INCORPORATED, San Jose, CA (US)

(72) Inventor: Thavatchai Montreevat, Irvine, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/702,368

(22) Filed: Dec. 3, 2019

(65) Prior Publication Data

US 2020/0177995 A1  Jun. 4, 2020

Related U.S. Application Data

(60) Provisional application No. 62/774,816, filed on Dec. 3, 2018.

(51) Int. Cl.
| | |
|---|---|
| *H04R 3/04* | (2006.01) |
| *H04R 1/10* | (2006.01) |
| *G06F 3/01* | (2006.01) |
| *H04W 4/80* | (2018.01) |
| *G01S 7/48* | (2006.01) |

(52) U.S. Cl.
CPC ............ *H04R 3/04* (2013.01); *G06F 3/011* (2013.01); *G06F 3/017* (2013.01); *H04R 1/1016* (2013.01); *H04R 1/1041* (2013.01); *H04W 4/80* (2018.02); *G01S 7/4808* (2013.01); *H04R 2420/07* (2013.01); *H04R 2430/01* (2013.01)

(58) Field of Classification Search
CPC ...... H04R 3/04; H04R 1/1016; H04R 1/1041; H04R 2420/07; H04R 2430/01; H04W 4/80; G06F 3/011; G06F 3/017; G01S 7/4808

See application file for complete search history.

(56) References Cited

U.S. PATENT DOCUMENTS

| | | | | |
|---|---|---|---|---|
| 2008/0140868 A1* | 6/2008 | Kalayjian | ............. | G06F 1/1698 710/8 |
| 2009/0131124 A1* | 5/2009 | Bibaud | ............... | H04M 1/6066 455/575.2 |

(Continued)

*Primary Examiner* — Matthew A Eason
*Assistant Examiner* — Kuassi A Ganmavo
(74) *Attorney, Agent, or Firm* — Paradice & Li LLP

(57) ABSTRACT

Systems and methods for detecting proximity of a wireless listening device to a user's ear comprise a housing adapted for positioning in and/or adjacent to an ear canal of a user, wireless components disposed within the housing, the wireless components operable to receive a wireless signal from a host device, and in-ear detection components operable to analyze the wireless signal and detect a proximity of the housing to the ear canal of the user. The in-ear detection components may include a differentiator operable to receive a gain of the wireless signal and output a rate of change of the gain, a comparator operable to output a proximity state if the rate of change is greater than a threshold value, wherein the proximity state includes an in-ear state and an open-air state, and false detection components operable to analyze the wireless signal to confirm the determined proximity state for an interval of time.

20 Claims, 3 Drawing Sheets

(56) References Cited

U.S. PATENT DOCUMENTS

| | | | |
|---|---|---|---|
| 2009/0156126 A1* | 6/2009 | Willis | G01S 11/06 455/41.3 |
| 2010/0159840 A1* | 6/2010 | Rosener | H04B 7/08 455/67.11 |
| 2010/0215170 A1* | 8/2010 | Kannappan | H04M 1/2535 379/418 |
| 2011/0092157 A1* | 4/2011 | Clark | H04M 1/6066 455/41.2 |
| 2011/0312279 A1* | 12/2011 | Tsai | H04W 4/21 455/67.11 |
| 2012/0015605 A1* | 1/2012 | Sole | H04W 12/06 455/41.3 |
| 2013/0094668 A1* | 4/2013 | Poulsen | H03G 11/002 381/107 |
| 2013/0114823 A1* | 5/2013 | Kari | H04M 1/6066 381/74 |
| 2013/0162459 A1* | 6/2013 | Aharony | G01S 13/04 342/27 |
| 2014/0155000 A1* | 6/2014 | Erkens | H04B 1/3833 455/73 |
| 2014/0370817 A1* | 12/2014 | Luna | H04W 8/005 455/41.3 |
| 2017/0208382 A1* | 7/2017 | Grinker | G10K 11/17885 |
| 2017/0295420 A1* | 10/2017 | Yeung | H04R 5/033 |

* cited by examiner

PROXIMITY DETECTION FOR WIRELESS IN-EAR LISTENING DEVICES

CROSS-REFERENCE TO RELATED APPLICATIONS

This application claims priority to and the benefit of U.S. Provisional Patent Application No. 62/774,816 filed Dec. 3, 2018 and entitled "PROXIMITY DETECTION FOR WIRELESS IN-EAR LISTENING DEVICES", which is hereby incorporated by reference in its entirety.

TECHNICAL FIELD

The present disclosure relates generally to wireless headsets, and more particularly for example, to systems and methods for operating low power, wireless in-ear headphones, such as earphones, earbuds and similar devices.

BACKGROUND

Wireless listening devices, such as earphones and earbuds, include one or more speakers for projecting an audible sound, and other components such as one or more microphones for picking up the user's own voice or environmental noise, audio processing circuitry to facilitate input and output audio processing, a battery and wireless communications components for communicating with a host device. Many wireless listening devices are designed to be positioned in or adjacent to the user's ear canal when in use. When the wireless listening device is not actively being used to output an audio signal, it is often desirable for the device to enter a low power mode to save battery power. Some wireless listening devices can detect whether an earphone or earbud is positioned in the user's ear through the use of dedicated sensors and/or other position sensing hardware that is added to the wireless listening device. However, in small, low power devices, these additional hardware components consume additional power, add to the size and complexity of the device, and can further increase manufacturing costs. In view of the foregoing, there is a continued need for improved systems and methods for detecting the position of a wireless in-ear listening device, such as earphones and earbuds, with respect to the user's ear.

SUMMARY

Improved systems and methods for detecting the proximity of a wireless, in-ear listening device (e.g., a wireless earphone or earbud) to the user's ear are disclosed herein. In some embodiments, systems and methods include automatic detection of whether a wireless, in ear listening device is (i) positioned in or adjacent to the ear canal of the user or, (ii) positioned away from the ear of the user. The systems and methods disclosed herein may be efficiently and cost effectively incorporated into existing wireless listening devices, such as earphones and earbuds, and may be used for automatic switching between power modes, for triggering different functions and operational modes, and for other uses as may be designed into the wireless in-ear listening device.

In one or more embodiments, a system includes a housing adapted for positioning in and/or adjacent to an ear canal of a user, wireless components disposed within the housing, the wireless components configured to receive a wireless signal from a host device, and in-ear detection components configured to analyze the wireless signal and detect a proximity of the housing to the ear canal of the user. The in-ear detection components are configured to determine an in-ear state and an open-air state. The system may further include a speaker disposed within the housing and configured to output an audio signal, and when the housing is positioned in and/or adjacent to the ear canal of the user, the speaker is configured to direct the output towards the ear canal. The system may also include audio output circuitry configured to receive the audio signal through the wireless signal and drive the speaker to generate the output, and wherein a volume control is adjusted based on the detected proximity.

In one or more embodiments, a method includes providing a housing adapted for positioning in and/or adjacent to an ear canal of a user, receiving, using wireless communications components disposed within the housing, a wireless signal from a host device, and detecting a proximity of the housing to the ear canal of the user by analyzing the wireless signal received from the host device using in-ear detection components disposed within the housing. In some embodiments, detecting the proximity of the housing further comprises determining whether the housing is in one of an in-ear state and an open-air state. The method may further comprise outputting an audio signal through a speaker disposed within the housing, wherein the audio signal is directed towards the ear canal of the user when the housing is positioned in and/or adjacent to the ear canal of the user, and receiving the audio signal in the wireless signal, driving the speaker to generate the output, and adjusting a volume control based on the detected proximity.

In some embodiments, the detecting a proximity of the housing to the ear canal of the user further comprises calculating, using a differentiator disposed in the housing, a rate of change of a gain of the wireless signal, and determining, using a comparator disposed in the housing, a proximity state based on a comparison of the rate of change to a threshold value, and wherein the proximity state includes one of an in-ear state and an open-air state. The method may further comprise confirming the determined proximity state over an interval of time, using false detection components disposed in the housing, by analyzing the wireless signal, and outputting an in-ear proximity signal if the determined proximity state is confirmed.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, wherein showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Figure 1B:
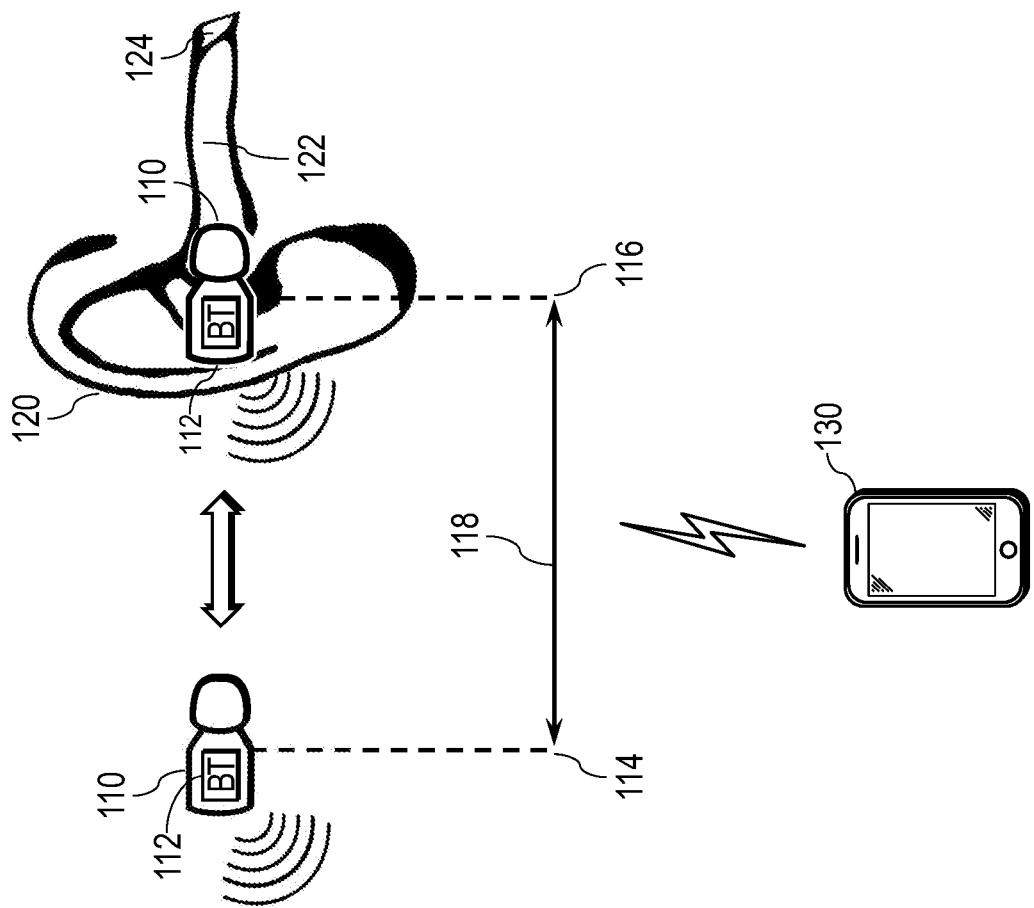
FIGS. 1A and 1B illustrate an example wireless, in-ear listening device, such as an earphone or earbud, in accordance with one or more embodiments of the present disclosure.

Improved systems and methods for detecting the proximity of a wireless, in-ear listening device are disclosed herein. In various embodiments, the wireless in-ear listening device is an earbud or earphone operable to determine whether it is positioned in (or adjacent to) the user's ear canal or positioned in an open-air location (or other location). The wireless listening device may use the in-ear detection to trigger a low power mode with minimal added system complexity compared to conventional proximity detection sensors and hardware components. In one embodiment, a wireless in-ear earbud is wirelessly coupled to a host device, such as a mobile phone. The wireless in-ear earbud is operable to monitor for a wireless radio reception efficiency signature which can be used to detect the action of placing the wireless in-ear earbud into the user's ear canal or pulling the wireless in-ear earbud out of the ear canal to the open air. Detection logic detects events associated with inserting/removing the earbud and sets a flag (or other indication) to indicate an in-ear or not in-ear detection status.

Wireless listening devices such as earbuds commonly include a radio transceiver (e.g., Bluetooth) for pairing with a host device. Using existing Bluetooth technology and a radio receiver that is commonly included with conventional wireless in-ear listening devices, the wireless in-ear listening device of the present disclosure can detect in-ear proximity. In some embodiments, the wireless in-ear listening device is operable to leverage information received from the Bluetooth radio antenna, including tracking reception efficiency. For many devices, radio efficiency and antenna gain may change between 20-30% (e.g., due to absorption and reflection) from a first position where the radio antenna is close to the user's ear (e.g., when the wireless in-ear listening device is inserted into the ear for listening) and a second position when the earphone is out in open air. Both the first position and second position are experienced when a user inserts and the device into an ear, and when the user removes the device from the ear.

A typical insertion and/or removal action can take approximately 0.5 to 1 second between the in-ear and open-air positions. A typical plug-in and pull out distance may be, for example, between 2 to 3 inches when the earbud is moved from ear canal to out in the open air and from the open-air position into the ear canal. Other movements and positions may also be observed, but the embodiments illustrated herein will focus the in-ear and open-air positions. The rate of change of the antenna reception during these two moves may define wireless reception signatures that when identified by the detection logic, toggle an operating state (in ear/not in ear) to indicate when to switch on/off certain functions, enter a low power mode or perform other operating functions.

Because the Bluetooth radio receiver is already present in many wireless earphone systems the embodiments disclosed herein can be implemented without needing to add components for proximity detection (e.g., infrared or capacitive proximity detector). In various embodiments, the detection logic analyzes a rate of change of a received Bluetooth signal (and other detection criteria as applicable) and compares the detected signal properties (e.g., rate of change) to one or more thresholds to identify detection events. Thus, the embodiments disclosed herein can be implemented without costing system complexity, power consumption and manufacturing expenditures. In some embodiments, the systems and methods disclosed herein can be applied to other wireless portable devices to lower power consumption when the device is not close to an object that absorbs or lowers radio wave power.

Figure 1A:
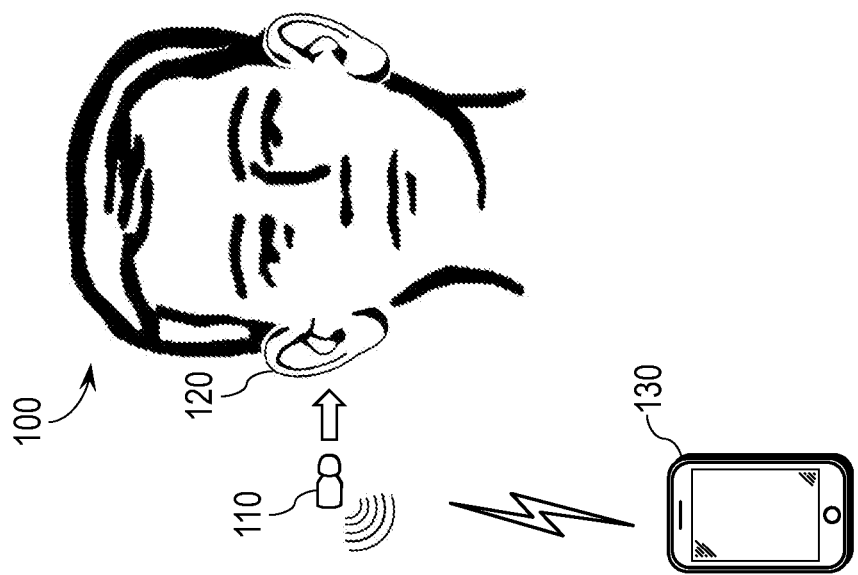

Various embodiments of the present disclosure will now be described with reference to the figures. Referring to FIGS. 1A and 1B, a personal wireless listening device, such as a wireless earbud 110, is adapted to fit into an ear 120 of a user 100. In operation, the wireless earbud 110 is operable to communicate wirelessly with a host system, such as mobile device 130. The wireless earbud 110 is designed to be inserted into the user's ear canal 122 (or adjacent thereto) where the audio output from the wireless earbud 110 is sensed by the user's ear drum 124. The wireless earbud 110 includes a Bluetooth transceiver 112 for transmitting and receiving communications (e.g., audio streams) between the wireless earbud 110 and the mobile device 130.

The user 100 will insert and remove the wireless earbud 110 into and from, respectively, the user's ear 120 as desired to listen to audio from the mobile device 130. During this process, the wireless earbud 110 passes between a first position 114 in the open air to a second position 116 where the wireless earbud 110 is securely positioned in the ear 120. As the wireless earbud 110 travels along a path 118 between the first position 114 and second position 116 (which may include any path between the ear 120 and an open-air position away from the ear 120), the characteristics of the wireless signal received from the mobile device 130 at the Bluetooth components 112 will change.

In the open air, first position 114, the wireless signal received from the mobile device 130 is received without interference from the ear 120 and the user's 100 head (e.g., flesh, bone, cartilage, etc.). In the in-ear, second position 116, the wireless signal received from the mobile device 130 will be impeded by the pinna of the ear 120, and other properties of the user 100's head. This change in the wireless signal characteristics received by the Bluetooth components 112 during insertion and removal of the wireless earbud 110 from the ear 120 are used in embodiments of the present disclosure to define a wireless signature for the wireless earbud 110 to determine whether the wireless earbud 110 is currently inserted in the ear 120 (in-ear) or has been removed from the ear 120 (not in-ear). In various embodiments, an open air wireless signal characteristic, an in-ear wireless signal characteristic, and/or a rate of change in the wireless signal during expected insertion or removal activities are used to detect the proximity of the wireless earbud 110 to the ear 120, and can be used to trigger a change in an operation of the wireless earbud 110, such as entering a low power mode, adjusting the output volume, and activating or disabling certain functions.

Figure 2:
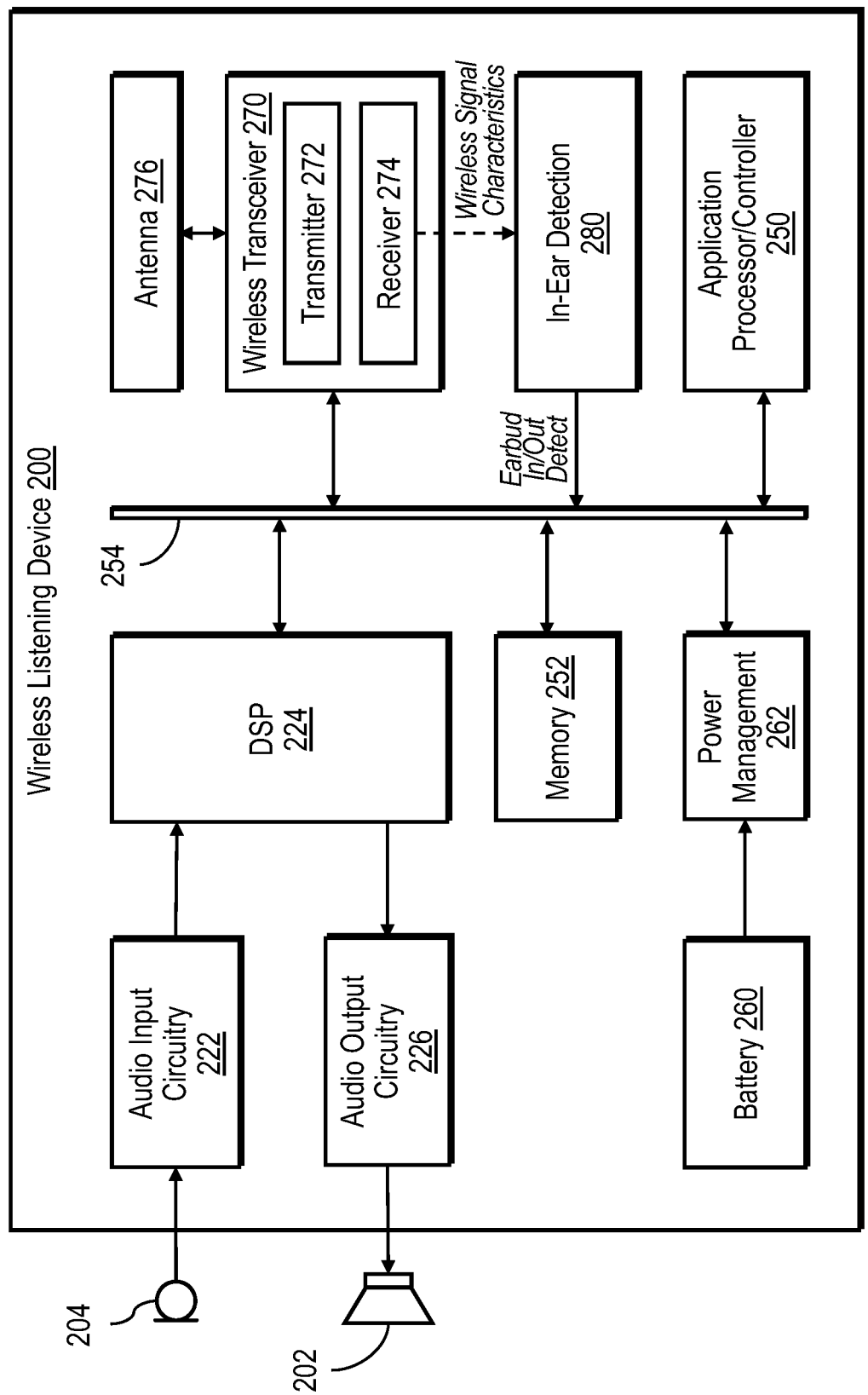
FIG. 2 illustrates example components of a wireless, in-ear listening device, such as an earphone or earbud, including in-ear detection logic, in accordance with one or more embodiments of the present disclosure.

Referring to FIG. 2, an example wireless listening device 200, such as a wireless earphone or earbud, in accordance with one or more embodiments, will now be described. As illustrated, the wireless listening device 200 includes a wireless transceiver 270, including a transmitter 272 and a receiver 274, coupled to an antenna 276 to facilitate wireless communications with a host device (e.g., mobile device 130 of FIGS. 1A & 1B) in accordance with a wireless communications protocol. For example, the communications interface may enable Bluetooth, Wi-Fi (e.g., 802.11) and/or other wireless connections, allowing the wireless listening device 200 to receive a stream of audio content for output to the user through a speaker 202.

In various embodiments, the wireless listening device 200 may further include an optional audio sensor 204 (e.g., a microphone) and audio input circuitry 222 for receiving external audio signals, which may include the user's own voice (e.g., for use in a voice-controlled device or communications such as a telephone or VoIP call) or external sounds (e.g., for cancellation in an adaptive noise cancellation device). The audio sensor 204 may comprise one or more sensors, each of which may be implemented as a transducer that converts audio inputs in the form of sound waves into an audio signal. The input audio signal is provided to the audio input circuitry 222, which may include, for example, an interface to the audio sensor 204, anti-aliasing filters, analog-to-digital converter circuitry, echo cancellation circuitry, and other audio processing circuitry and components. The audio output circuitry 226 processes audio signals received from the digital signal processor 224 for output to the speaker 202. In various embodiments, the audio output circuitry 226 may include a digital-to-analog converter (DAC) that converts one or more digital audio signals to analog, an amplifier for driving the speaker 202, and other audio circuitry as appropriate.

The digital signal processor 224 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. For example, the digital signal processor 224 may include a digital signal processing module, which may represent any suitable combination of hardware components and software instructions, configured to perform various operations as further discussed herein. The digital signal processor 224 is operable to process the audio input signals, which are obtained by the audio sensor 204, and audio output signals, which are received from the host device through the receiver 274.

The wireless listening device 200, further includes in-ear detection components 280, which include circuitry and/or logic operable to detect a proximity of the wireless listening device 200 to a user's ear. In various embodiments, the in-ear detection components 280 are arranged to receive real time wireless signal characteristics from the receiver 274, detect a wireless signature indicative of an in-ear position, an open-air position and/or a transition between the in-ear and open-air positions, and output detection information representing a determined in-ear/open air position status.

In various embodiments, the in-ear detection components 280 are operable to detect a wireless signal signature that distinguishes between in-ear and open-air positions. In one embodiment, for example, the in-ear detection components 280 are operable to calculate a rate of change in the signal gain received at antenna 276 and compare the detected rate of change to a threshold value. The in-ear detection components 280 may be implemented in hardware (e.g., circuitry including a differentiator and a comparator), software or combination of hardware and software. The in-ear detection components 280 may include, for example, program instructions stored in a memory (e.g., memory 252) and executed by a processing unit of the wireless listening device (e.g., application processor/controller 250).

In some embodiments, the in-ear detection components 280 are operable to determine in-ear proximity by analyzing at least T seconds of signal characteristics received by receiver 274, where T is at least an amount of time needed to capture a wireless signal signature. In various embodiments, the time T is an estimated time it takes for a user to insert the wireless listening device into the user's ear and/or remove the wireless listening device from the user's ear, and the detected rate of change is the change in the wireless signal gain between the in-ear and open-air position during the insertion/removal operation. In some embodiments, the time T encompasses an amount of time expected for the user to move the wireless listening device 200 along an insertion and removal path (e.g., path 118 in FIG. 1B), and may be for example, between 0.5 and 2 seconds in many embodiments.

The in-ear detection components 280 may be tuned or configured for a particular user to identify a specific wireless signature indicating the proximity of the wireless listening device 200 to the user's own ear. In one embodiment, a wireless signature includes one or more of a wireless strength in the ear, a wireless strength in open air, a rate of change of the wireless signal along the path 118 during insertion, and a rate of change along a path 118 during removal. In one embodiment, if a rate of change of the wireless signal over a time period T is greater than a threshold rate of change, then an in-ear or open-air state will be detected, as appropriate.

The wireless listening device 200 may further include a battery 260 and power management components 262. The power management components 262 are operable to control the power consumption from the battery 260 by enabling and/or disabling components of the wireless listening device 200. In some embodiments, the power management components 262 are operable to receive the detection information from the in-ear detection components 280 and switch to an appropriate high power mode, low power mode and/or sleep mode based, in-part, in the detection information. For example, the power management components 262 may enter a high power mode when the detection information indicates that the wireless listening device 200 has been detected to be in the user's ear and may enter a low power mode when the detection information indicates that the wireless listening device 200 has been detected to be in an open-air position.

The wireless listening device may comprise various hardware and software components for operating the wireless listening device 200. In the illustrated embodiment, the wireless listening device 200 includes application processor/controller 250 and a memory 252. The application processor/controller 250 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations of the wireless listening device 200, including operations discussed herein for implementing embodiments of the present disclosure. The application processor 250 is configured to interface with other system components over a bus 254 or other communications interface. Further, in some embodiments, at least some or all of the functionalities that these hardware components and circuitries are operable to perform may be implemented as software modules being executed by the application processor/controller 250 and/or digital signal processor 224 in response to software instructions and/or configuration data stored in the memory 252, firmware of the digital signal processor 224 or other device logic.

The memory 252 may be implemented as one or more memory devices configured to store data and information, including audio data and program instructions. Memory 252 may comprise one or more various types of memory devices including volatile and non-volatile memory devices, such as RAM (Random Access Memory), ROM (Read-Only Memory), EEPROM (Electrically-Erasable Read-Only Memory), flash memory, direct memory access and/or other types of memory components. The application processor/controller 250 may be configured to execute software instructions stored in the memory 252.

The application processor/controller 250 and/or program memory 252 may be configured to alter an operation of the wireless listening device 200 in response to the determined in-ear detection state. For example, the volume level output through the speaker 202 may be adjusted depending on whether the in-ear position or open-air positions are detected. The system may further allow for configuration of the in-ear detection signatures, including a test environment for detecting wireless signals at the in-ear and open-air positions, and the change in signal strength over time during insertion and removal activities to learn the user's specific wireless signature (e.g., time, distance, change in wireless signals, etc.). As previously discussed, Bluetooth radio receiver and antenna efficiency changes information when an earbud is in or out of the user's ear. In one embodiment, the wireless listening device 200 enters a sleep more when in an open-air position to conserve power, which may include reducing or stopping audio output, limiting audio input (e.g., to listening for a trigger word) and reducing wireless communications with the host device.

During the sleep mode, the in-ear detection 280 detects the wireless signal characteristics. If a change in signal characteristics is detected that satisfies a wireless signature for in-ear position, then the in-ear detection outputs an in-ear detection state, which is received by the power management components 262 causing the wireless listening device 200 to wake up from the sleep mode.

Figure 3:
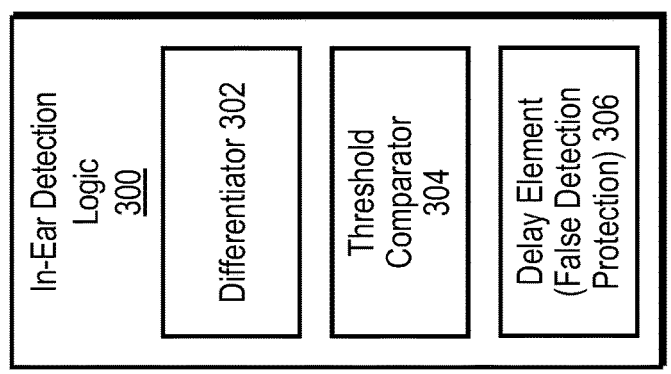
FIG. 3 is a block diagram illustrating example in-ear detection logic in accordance with one or more embodiments of the present disclosure.

Embodiments of systems and methods for detecting efficiency changes will now be described in further detail in FIGS. 3 and 4. FIG. 3 illustrates an embodiment of in-ear detection logic 300, which may be implemented as in-ear detection components 280 of FIG. 2. In the illustrated embodiment, the in-ear detection logic 300 includes a differentiator 302, a comparator 304 and a delay element 306, which is operable to provide false detection protection. The differentiator 302 may be implemented as hardware or software to detect a rate of change of the wireless signal gain over a detection time interval. The threshold comparator 304 may be implemented as hardware or software to compare the detected rate of change of the wireless signal gain with a threshold value. If the rate of change is greater than the threshold, then an in-ear/open-air state change is detected. The delay element 306 provides false detection protection to confirm that the detected state change was the result of an in-ear/open-air transition. In various embodiments, the delay element 306 may be operable to track the signal strength after detection to confirm that wireless device is in the detected in-ear or open-air state (e.g., a steady wireless signal strength at an in-ear or open-air level).

The threshold may be set by the system through a test environment, and/or adjusted and tuned by the user to provide performance that is satisfactory to the user experience. The methods described herein, including a differentiator, a comparator and false detection protection logic provide for reliable detection of in-ear and open-air states. The threshold is selected to discriminate against normal signal drop out due to normal interference from surrounding objects and pairing host device relative distance changes. The wireless signature criteria may include the rate of change, the time period for measuring the change, the magnitude of the change, the starting reception level, and the ending reception level. In one embodiment, the proximity detection signal determined by calculating (i) the change of the received signal level (which may be adjusted by a programmable strength range, such as 10% to 50%), divided by (ii) the change in time (e.g., with a programmable range from 0.25 sec to 2 sec). If the value is over a predetermined threshold value, then proximity detection signal may be set to the new proximity state.

Figure 4:
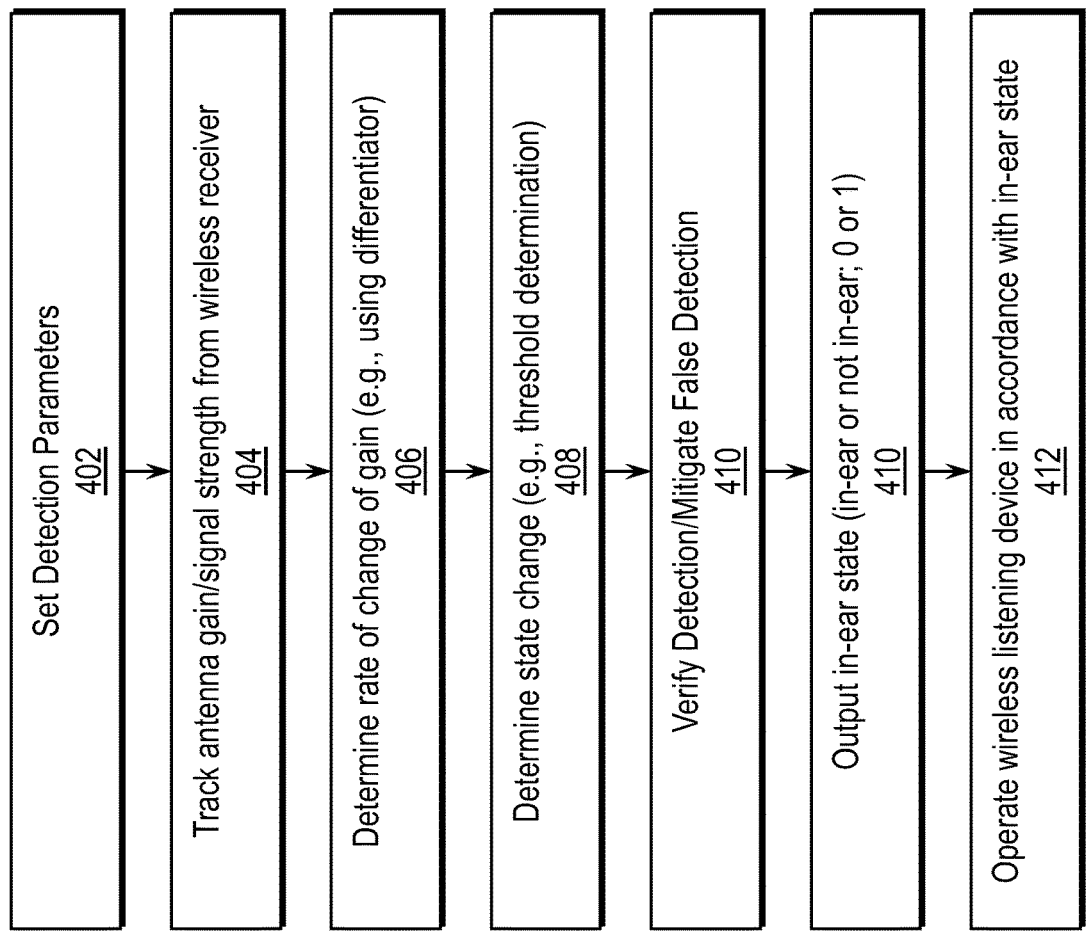
FIG. 4 is a flow chart illustrating an example operation of in-ear detection logic, in accordance with one or more embodiments of the present disclosure.

Referring to FIG. 4, an example algorithm for implementing in-ear detection logic in a wireless listening device will now be described. In step 402, the wireless signatures for the states to be detected are defined, which may include an in-ear state, an open-air state and/or transitions between the in-ear and open-air states. In some embodiments, the wireless signatures are defined for the device and fixed during product design or manufacture. In some embodiments, the wireless signatures may be trained for the user through a series of user prompts and/or be configured to accommodate the user's preferences. The training system can store, for example, an expected rate of change in the wireless signal strength when the user inserts and/or removes an earbud. The wireless signatures may then be detected during operation to determine an in-ear or open-air state.

In step 404, the wireless listening device tracks the antenna gain/signal strength from the wireless receiver during operation. The rate of change of the wireless signal is calculated (step 406) and compared to a threshold (step 408) to detect a state change. In some embodiments, a Bluetooth signal is monitored and a rate of change over time (e.g., 0.5 seconds) is tracked to determine if the wireless listening device has changed proximity to the user's ear. In some embodiments, a differentiator circuit may be utilized to determine rate of change in the wireless signal gain. In other embodiments, the differentiator may be implemented as logic executed by the processing unit of the wireless listening device. In some embodiments, the system is operable to detect a rate of change indicative of an in-ear insertion or removal. The time interval can be short (e.g., 0.5 seconds), to detect a quick change in the signal strength that approximates the change in expected gain.

In various embodiments, the starting value, the change in values over time, which may include one or more intermediate data points, are compared to the wireless signatures. If a match is found in step 408, then the in-ear detection state is updated. The signature of reception change can be detected and identified to toggle a detection logic to indicate when to switch on/off functions and enter low power mode. In various embodiments, the system may use the state for power management (e.g., enter a sleep mode), adjust functionality (e.g., change volume between in-ear and open-air states; turn off microphone when not in ear, etc.).

After a state change is determined, false detection logic is implemented in step 410 to verify detection and mitigate false detection events. In one embodiment, a delay is implemented before changing the detected state to determine if the earbud is in a steady state indicative of the changed state, for example, by tracking the received gain that approximates in-ear or open-air status, respectively, during the delay period.

After the detected state change has been confirmed by the system, the in-ear detection logic outputs the detected state in step 410. In some embodiments, it may be a 0 or 1 indicating an in-ear or open space state, respectively. Next, in step 412, the wireless listening device is operated in accordance with the detected in-ear state. In some embodiments, the in-ear state is used for power management to enter into high power, low power, or sleep modes as appropriate. In some embodiments, functionality may be controlled or adjusted based on the detected state. For example, volume may be adjusted between in-ear and open-space state, or the microphone may be enabled or disabled depending on whether the user determined to be wearing the headset. The states may also be passed along to the host device, which may change input or output modes depending on the proximity of the earbud to the user's ear. For example, if the earbud is not in-ear, microphone input may be switched to a microphone on the host device, and audio prompts may be played over the speaker of the host device.

It should be apparent that the foregoing disclosure has many advantages over the prior art. The solutions disclosed herein are less expensive to implement than conventional solutions, and do not require precise prior training/calibration, nor the availability of a specific activity-detection sensor. Provided there is room for a second inside microphone, it also has the advantage of being compatible with, and easy to integrate into, existing headsets. Convention solutions require pre-training, are computationally complex, and the results shown are not acceptable for many human listening environments.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    an in-ear listening device housing adapted for positioning in and/or or adjacent to an ear canal of a user;
    wireless components disposed within the in-ear listening device housing, the wireless components configured to receive a wireless signal from a host device; and
    in-ear detection components configured to:
        detect a rate of change of a signal strength of the wireless signal, the detected rate of change associated with an insertion of the in-ear listening device housing into the user's ear or a removal of the in-ear listening device housing from the user's ear, and
        determine a proximity of the in-ear listening device housing to the ear of the user based on the detected rate of change of the signal strength, the determined proximity representing one of an in-ear state or an open-air state.

2. The system of claim 1, wherein the system further comprises a speaker disposed within the in-ear listening device housing and configured to output an audio signal; and
    wherein, the speaker is configured to direct the audio signal towards the user's ear canal during the determined in-ear state.

3. The system of claim 2, further comprising audio output circuitry configured to receive the audio signal through the wireless signal and drive the speaker to generate the audio signal, and wherein a volume control is adjusted based on the determined proximity of the in-ear listening device housing.

4. The system of claim 1, wherein the wireless components comprise an antenna and a Bluetooth receiver.

5. The system of claim 1, wherein the in-ear detection components comprise:
    a differentiator configured to receive a gain of the wireless signal and output a rate of change of the gain; and
    a comparator configured to output a proximity state indicating the proximity of the in-ear listening device housing if the rate of change is greater than a threshold value.

6. The system of claim 5, wherein the in-ear detection components further comprise false detection components configured to analyze the wireless signal to confirm a new proximity state for an interval of time; and
    wherein the in-ear detection components are configured to output a change in the in-ear proximity signal if the new proximity state is confirmed.

7. The system of claim 1, further comprising a memory configured to store program instructions and a processor configured to execute the program instructions;
    wherein the in-ear detection components comprise detection logic stored in the memory; and
    wherein the detection logic is tuned to detect the user moving the in-ear listening device housing between an open-air position and an in-ear position.

8. The system of claim 7, wherein the detection logic is further tuned to detect a drop in antenna gain over a time interval.

9. The system of claim 1, further comprising power management components configured to change a power management mode based on the determined proximity of the in-ear listening device housing.

10. The system of claim 1, further
    comprising an application processor configured to execute a plurality of processes, wherein at least one of the plurality of processes is executed depending, in part, on the determined proximity of the in-ear listening device housing.

11. The system of claim 1, wherein the in-ear listening device housing comprises an earbud housing adapted for positioning in the ear canal of the user.

12. The system of claim 1, wherein the in-ear detection components are further configured to detect a wireless signature comprising an open-air wireless signal strength, the detected rate of change of the wireless signal, and an in-ear wireless signal strength.

13. The system of claim 12, wherein the in-ear detection components are further configured to determine the proximity of the in-ear listening device housing based on the detected wireless signature.

14. A method comprising:
    providing an in-ear listening device housing adapted for positioning in or adjacent to an ear canal of a user;
    receiving, using wireless communications components disposed within the in-ear listening device housing, a wireless signal from a host device;
    detecting a rate of change of a signal strength of the wireless signal;
    analyzing the detected rate of change of the signal strength of the wireless signal to detect an insertion of the in-ear listening device housing into the user's ear or removal of the in-ear listening device housing from the user's ear; and determining a proximity of the in-ear listening device housing to the ear of the user based on the detected rate of change of the signal strength, the determined proximity representing one of an in-ear state or an open-air state.

15. The method of claim 14, further comprising outputting an audio signal through a speaker disposed within the in-ear listening device housing, wherein the audio signal is directed towards the ear canal of the user when the in-ear listening device housing is positioned in or adjacent to the ear canal of the user.

16. The method of claim 14, further comprising receiving an audio signal in the wireless signal, driving a speaker to generate an output comprising the audio signal, and adjusting a volume control of the output based on the determined proximity of the in-ear listening device housing.

17. The method of claim 14, wherein determining the proximity of the in-ear listening device housing to the ear of the user further comprises:

calculating, using a differentiator disposed in the in-ear listening device housing, a rate of change of a gain of the wireless signal;

wherein the proximity is determined using a comparator disposed in the in-ear listening device housing based on a comparison of the rate of change to a threshold value.

18. The method of claim 14, further comprising:

confirming the determined proximity over an interval of time, using false detection components disposed in the in-ear listening device housing, by analyzing the wireless signal; and outputting an in-ear proximity signal if the determined proximity is confirmed.

19. The method of claim 14, further comprising detecting whether the user moved the in-ear device housing between an open-air position and an in-ear position.

20. The method of claim 14, further comprising changing a power management mode based on the determined proximity of the in-ear listening device housing.

\* \* \* \* \*

UNITED STATES PATENT AND TRADEMARK OFFICE
CERTIFICATE OF CORRECTION

PATENT NO. : 11,297,429 B2
APPLICATION NO. : 16/702368
DATED : April 5, 2022
INVENTOR(S) : Thavatchai Montreevat It is certified that error appears in the above-identified patent and that said Letters Patent is hereby corrected as shown below:

In the Claims

Column 9, Line 45, Claim 1, delete "in and/or or adjacent to an ear canal of a user;" and insert
-- in or adjacent in an ear canal of a user; --

Signed and Sealed this
Twenty-fourth Day of May, 2022

Katherine Kelly Vidal
*Director of the United States Patent and Trademark Office*